US009561431B1

(12) United States Patent
Pulido

(10) Patent No.: US 9,561,431 B1
(45) Date of Patent: *Feb. 7, 2017

(54) INTERACTIVE AUDIO-VISUAL PUZZLE

(71) Applicant: Gabriel E. Pulido, Miami, FL (US)

(72) Inventor: Gabriel E. Pulido, Miami, FL (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/559,716

(22) Filed: Dec. 3, 2014

Related U.S. Application Data

(63) Continuation-in-part of application No. 13/528,272, filed on Jun. 20, 2012, now Pat. No. 8,926,417.

(51) Int. Cl.
*A63F 9/00* (2006.01)
*A63F 9/06* (2006.01)

(52) U.S. Cl.
CPC .................................. *A63F 9/0612* (2013.01)

(58) Field of Classification Search
None
See application file for complete search history.

(56) References Cited

U.S. PATENT DOCUMENTS

| | | | |
|---|---|---|---|
| 3,981,505 A | 9/1976 | Odier | |
| 4,893,817 A | 1/1990 | Shilo | |
| 5,010,495 A | 4/1991 | Willetts | |
| 5,087,043 A | 2/1992 | Billings et al. | |
| 5,643,084 A | 7/1997 | Mirsky | |
| 5,647,796 A | 7/1997 | Cohen | |
| 6,211,453 B1 | 4/2001 | Kurakake | |
| 6,264,198 B1 | 7/2001 | Stamper | |
| 6,589,116 B1 | 7/2003 | Grigoriev et al. | |
| 6,756,534 B2 | 6/2004 | Gimpelson et al. | |
| 6,790,138 B1 | 9/2004 | Erlichman | |
| 6,979,245 B1 | 12/2005 | Goodwin | |
| 7,585,216 B2 | 9/2009 | Foster | |
| 8,528,905 B2 | 9/2013 | Bianco | |
| 8,926,417 B1 | 1/2015 | Pulido | |
| 2002/0111203 A1 | 8/2002 | Chi | |
| 2003/0162160 A1 | 8/2003 | Horchler et al. | |
| 2003/0162161 A1 | 8/2003 | Horchler | |
| 2006/0267276 A1 | 11/2006 | Farmer, Jr. et al. | |
| 2011/0031689 A1 | 2/2011 | Binder | |
| 2011/0148040 A1 | 6/2011 | Bianco | |
| 2012/0122066 A1 | 5/2012 | Dohring et al. | |
| 2013/0266924 A1 | 10/2013 | Zelin | |
| 2013/0341863 A1 | 12/2013 | Weinshanker et al. | |

*Primary Examiner* — Seng H Lim
(74) *Attorney, Agent, or Firm* — Hanrahan Law Firm, P.A.; Benjamin M. Hanrahan

(57) ABSTRACT

An interactive audio-visual puzzle is presented herein. Particularly, in order to create, design or otherwise prepare the puzzle, audio content and a digital object are selected and partitioned into a plurality of separate segments or pieces. For example, the audio content may be partitioned in separate segments of time and the object may be separated into a plurality of visual puzzle pieces. Each of the puzzle pieces are assigned or associated with a different one of the audio segments. The puzzle pieces may be movably (e.g., liner, planar, rotational, etc.) disposed about the display. The goal of the puzzle or game is for the player to reconstruct both the visual object and the audio composition by aligning the puzzle pieces in the correct order, orientation and/or rotationally aligned relation.

20 Claims, 13 Drawing Sheets

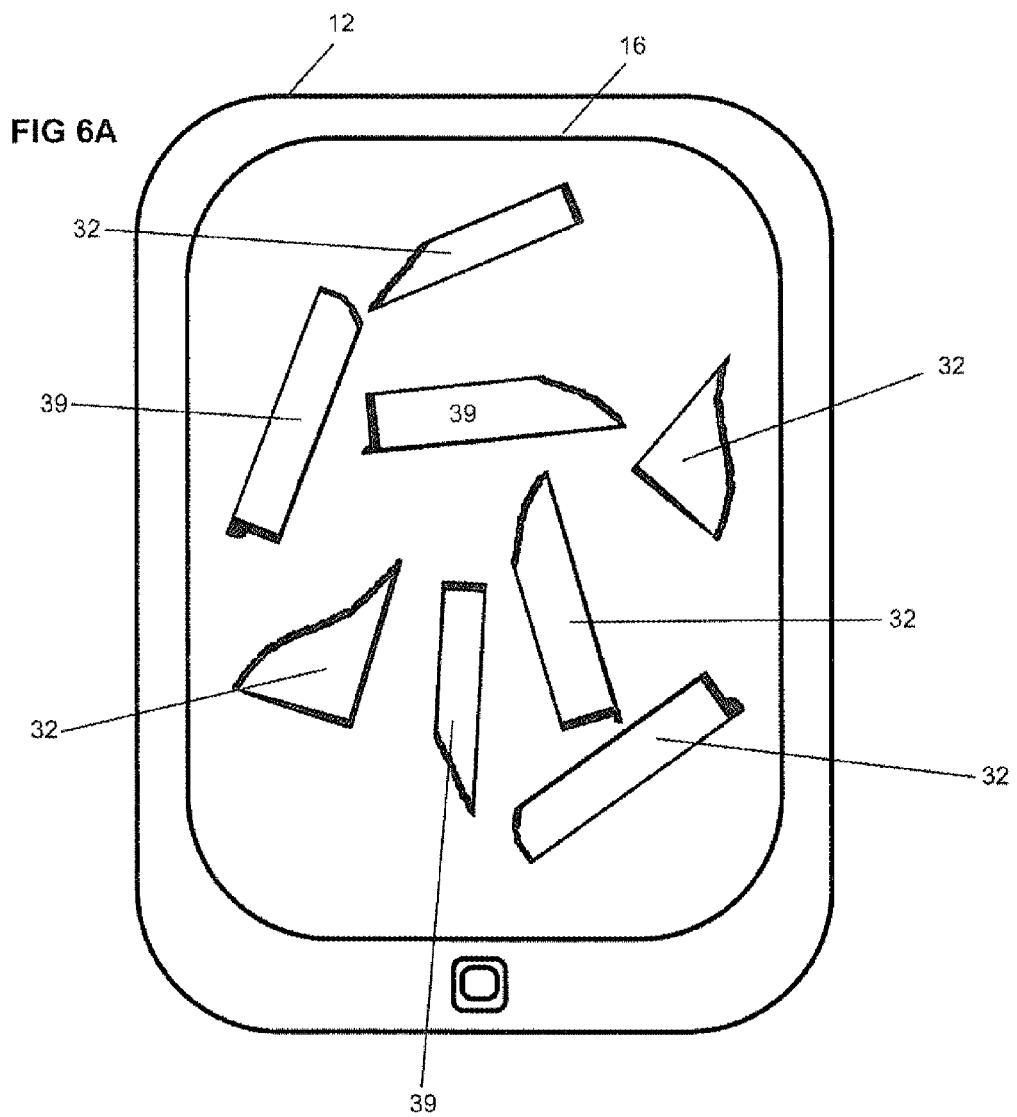

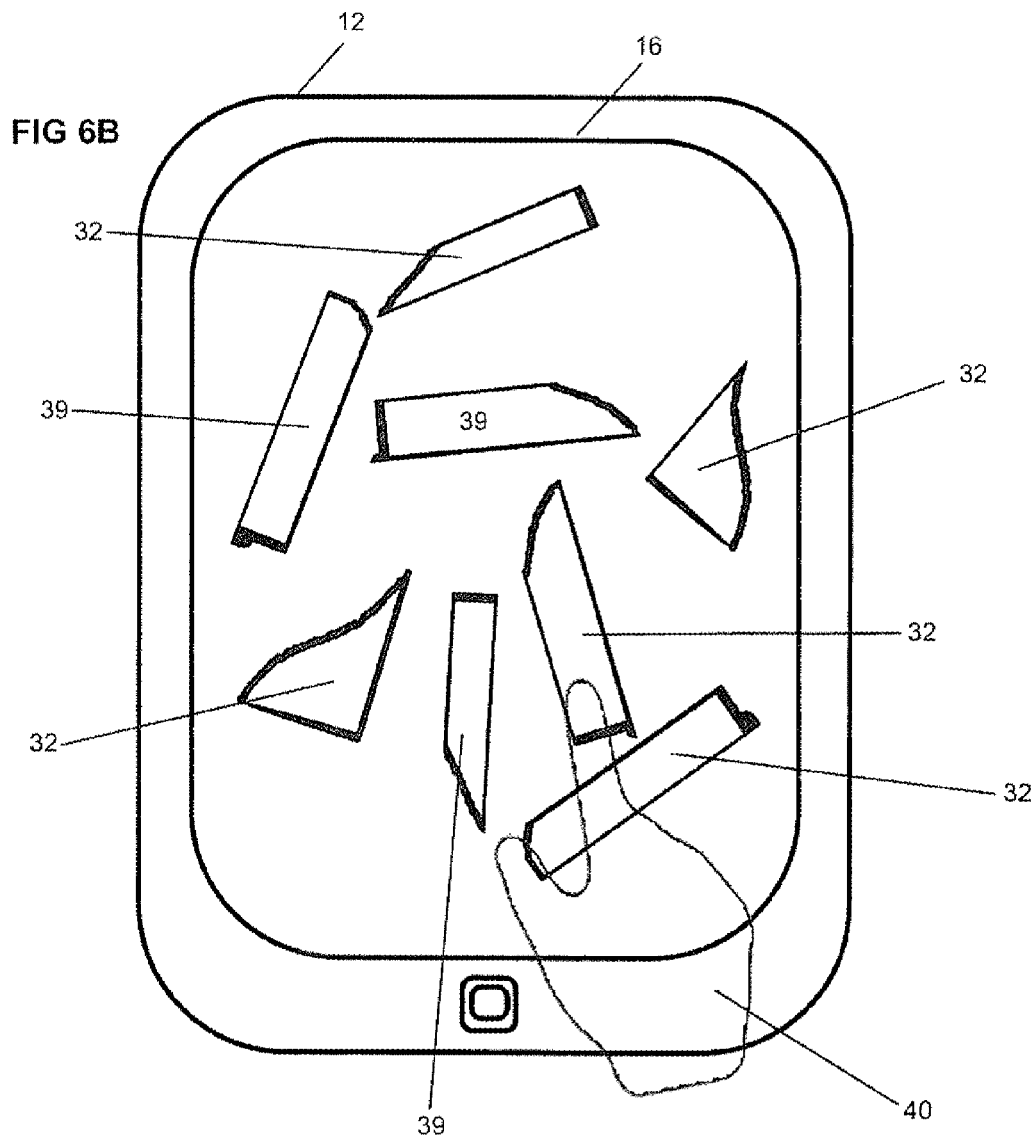

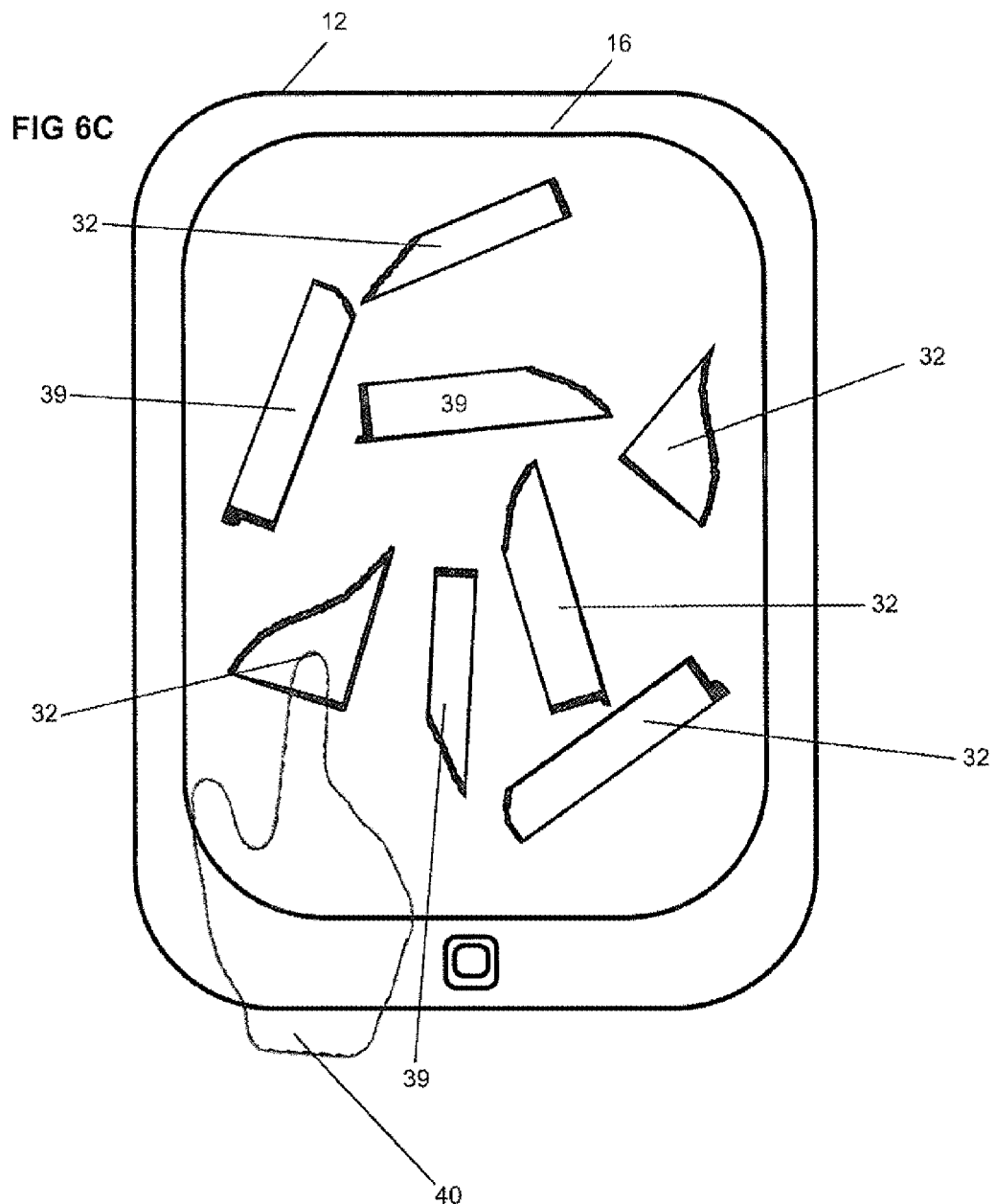

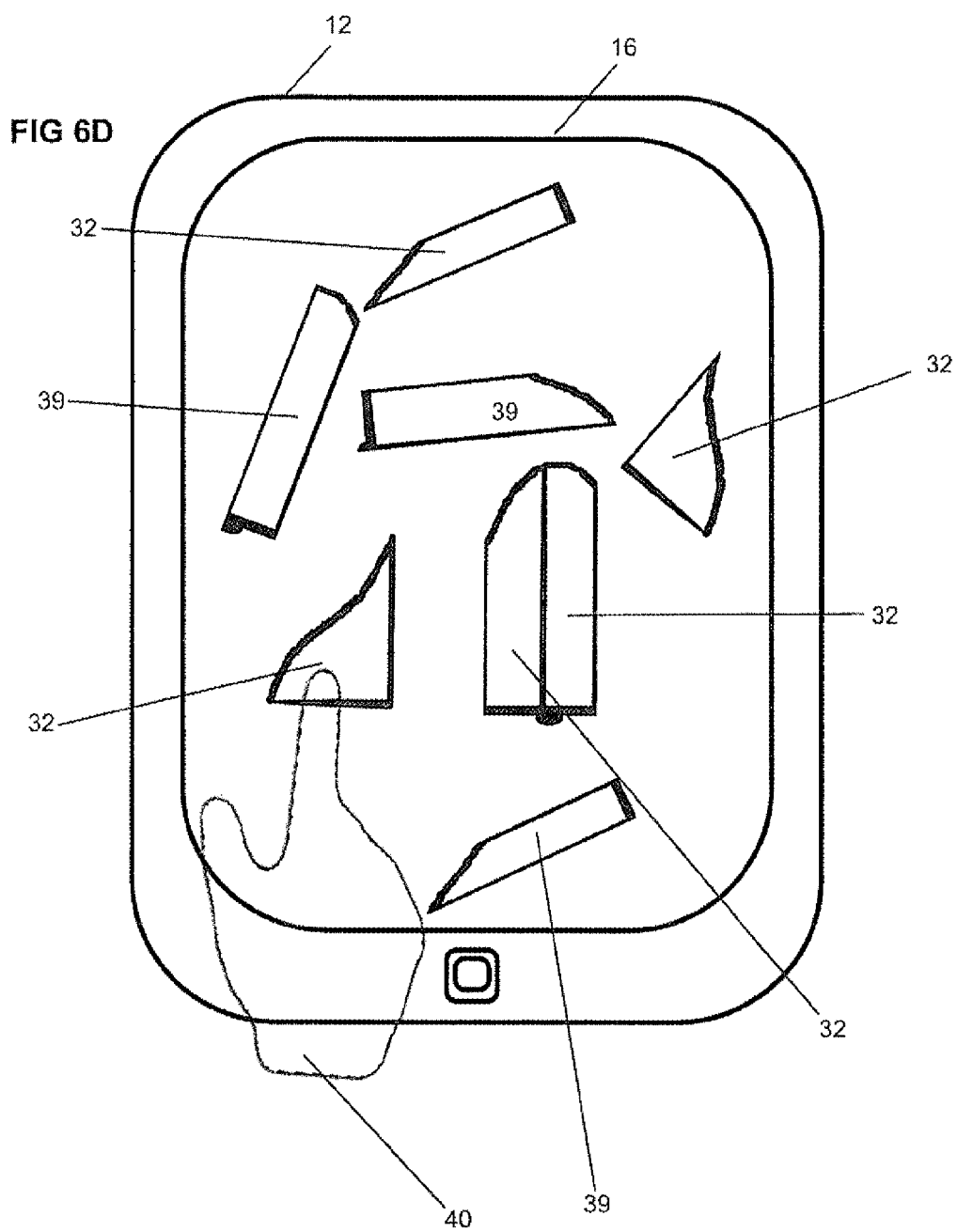

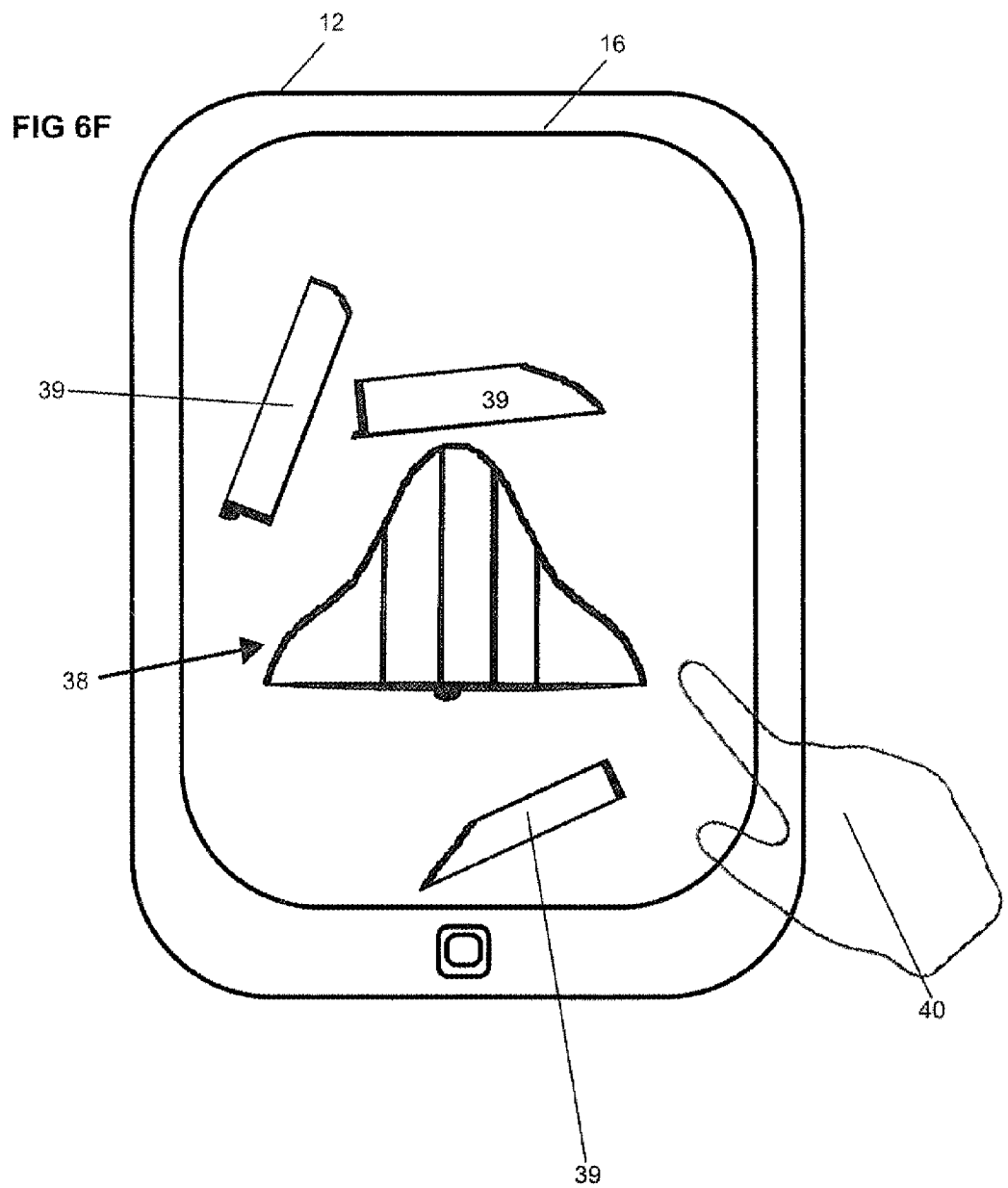

INTERACTIVE AUDIO-VISUAL PUZZLE

CLAIM OF PRIORITY/CROSS REFERENCE TO RELATED APPLICATIONS

The present application is a Continuation-In-Part patent application of previously-filed, currently-pending U.S. patent application Ser. No. 13/528,272, having a filing date of Jun. 20, 2012, the content of which is incorporated herein by reference in its entirety.

FIELD OF THE INVENTION

The present invention is generally directed to a novel system and method for an interactive audio-visual puzzle which may be executed, implemented or accessed by a computer system, such as a mobile phone, gaming system, desktop/laptop computer, etc. In particular, the present invention comprises a computer-based puzzle including a plurality of virtual puzzle pieces, wherein, in addition to a visual or graphical component, each of the puzzle pieces also comprise or is otherwise assigned an audio component corresponding to a portion or segment of an audio or musical composition or content. Upon user manipulated disposition of the puzzle pieces in a completed, aligned orientation, the puzzle pieces will visually and collectively represent a predetermined graphical object, and the audio components thereof will collectively correspond to a continuous portion of the audio composition or content.

BACKGROUND OF THE INVENTION

Games involving the manipulation and/or arrangement of visual puzzle pieces to recreate a final picture or graphic are known. These types of games typically involve multiple puzzle pieces that physically connect to one another in various ways and which collectively represent a final picture.

While these games may be beneficial in terms of visual education and/or stimulation, they fail to provide any audio knowledge, education or interaction. Thus, they tend to provide little to no opportunity for the development or stimulation of a user's audio skills.

Accordingly, there is a need in the art for a new puzzle game that incorporates audio and visual components that can be interactively stimulated as the user or player attempts to solve the puzzle. In particular, the proposed puzzle will include a plurality of puzzle pieces, each of which comprise a visual and audio component. When solved, the puzzle pieces will be disposed in an aligned or solved orientation revealing a graphical object and collectively playing an audio composition or audio content. The player can thus use both the audio and visual components of the pieces to assist in positioning the pieces in the correct orientation.

SUMMARY OF THE INVENTION

As will be described herein, the present invention is generally directed to a system and method for an interactive audio-visual puzzle. Particularly, in order to create, design or otherwise prepare the puzzle of the various embodiments of the present invention, an audio composition or audio content (e.g., a song, instrumental, orchestral composition, audio reading of a poem, book, or other piece, spoken words, field sound recordings, sound effects, movie soundtracks, etc., or any portion thereof) and a digital object (e.g., a two or three dimensional image) is selected. In certain embodiments, the object at least partially corresponds to the composition or audio content in that the object may visually represent one or more aspects, meanings, settings, etc. of the selected song.

Once the audio content and the object are selected, both are partitioned or broken into separate segments or pieces. For example, the composition or audio content may be partitioned in separate segments of time and the object may be separated into a plurality of visual puzzle pieces. In one embodiment, the number of puzzle pieces is equal to the number of audio segments. Accordingly, each of the puzzle pieces will be assigned a different one of the audio segments such that each puzzle piece will comprise a visual or graphic element and an audio component. It should be apparent that a single audio composition may be the subject of multiple different puzzles, each of the different puzzle comprising a different graphical object. For instance, a single song may include multiple different settings, meanings, or descriptions in that a single song may be associated with a plurality of different objects and therefore be the subject of a plurality of different puzzles. Similarly, of course, a single object (e.g., a picture of a bell) may be associated with multiple different songs, audio compositions or audio content.

The goal of the puzzle or game is for the player to reconstruct both the visual object and the audio content by aligning the puzzle pieces in the correct order or orientation. In particular, with the puzzle pieces in the correct, solved or aligned orientation, the graphical object will be visually reconstructed and the audio composition or content will also be reconstructed. Specifically, in one embodiment, the object is partitioned from left to right along a single axis such that the puzzle pieces comprise vertical slices of the object from left to right. When solved, the audio components of the puzzle pieces will play the audio composition or content from left to right in the correct and continuous manner, as if the horizontal axis corresponds to the timeline of the audio composition or content. Of course, other orientations may be implemented, e.g., from top to bottom, angular, spiral, circular, along an x-axis (horizontal), y-axis (vertical), or z-axis (depth), etc., so long as there is a beginning location and an end location.

These and other objects, features and advantages of the present invention will become clearer when the drawings as well as the detailed description are taken into consideration.

BRIEF DESCRIPTION OF THE DRAWINGS

For a better understanding of the nature of the present invention, reference should be made to the following detailed description taken in connection with the accompanying drawings in which:

FIGS. 6A through 6F are exemplary screen shots illustrating the method shown in FIG. 5.

Like reference numerals refer to like parts throughout the several views of the drawings.

DETAILED DESCRIPTION OF THE INVENTION

As shown in the accompanying drawings, the present invention is generally directed to a system 10 and method 100 for a computer-based interactive audio-visual puzzle. In particular, the various embodiments of the present invention comprises a computer program, software module or application, such as an interactive puzzle application, that includes a plurality or series of instructions which are interpreted, executed, run, or accessed by a computer system 12 in order to implement the system 10 and method 100 of the present invention in the intended manner, as discussed fully herein.

Figure 1:
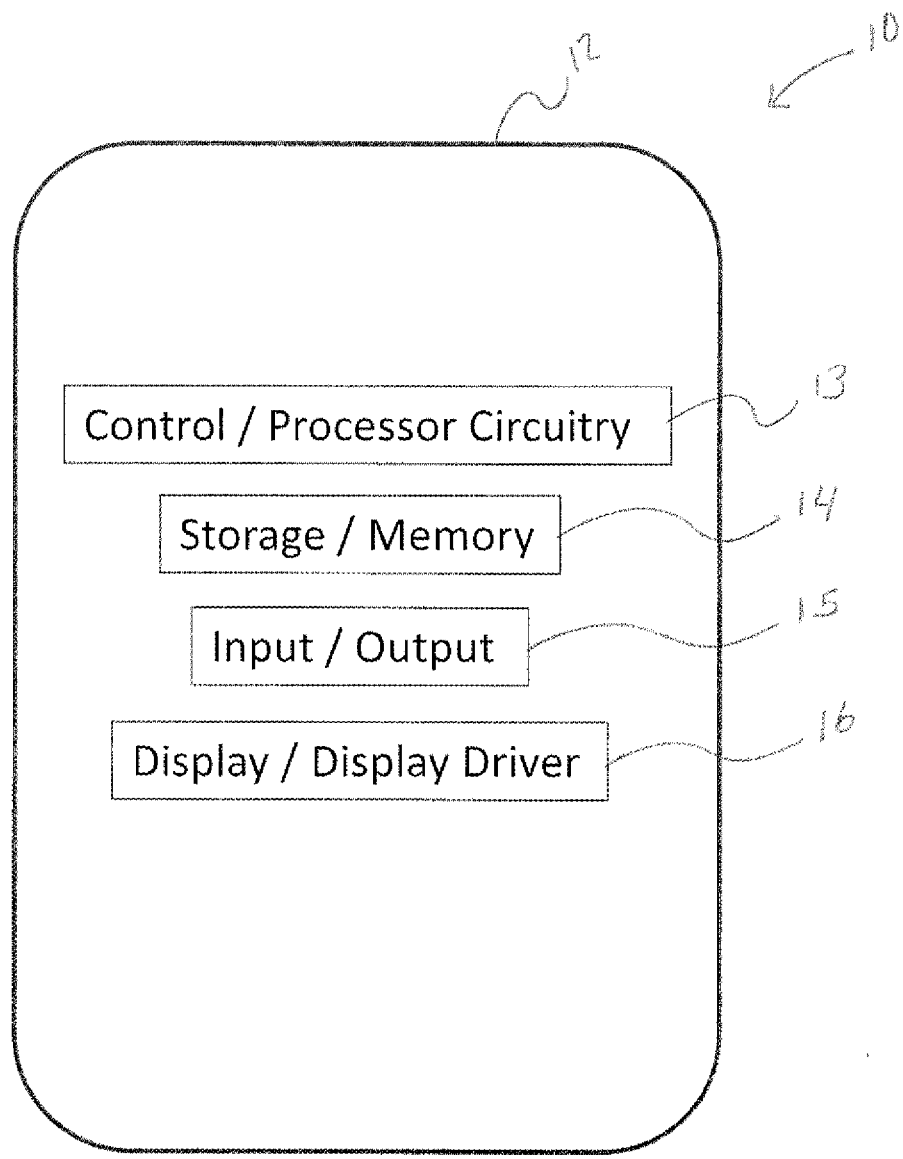
FIG. 1 is a schematic representation of the computer system used in connection with at least one embodiment of the present invention.

Particularly, referring to the high-level schematic representation, as shown in exemplary FIG. 1, the computer system 12 of at least one embodiment comprises a computer processor represented by control circuitry 13, storage and/or 18 memory 14, and input/output circuitry 15.

Specifically, the control circuitry and/or computer processor 13 can include virtually any processing circuitry or processor operative to at least partially control the operations and performance of the computer system 12, as described in greater detail herein. For example, control circuitry 13 can be used to run, access, and/or execute various applications, modules or programs including, but not limited to, operating system applications, firmware applications, or any other application, including the interactive puzzle application as described in accordance with the present invention. In some embodiments, control circuitry 13 can drive a display 16 and process inputs received from a user interface.

Further, the storage device and/or memory 14 can include, for example, one or more storage mediums including a hard-drive, solid state drive, flash memory, permanent memory such as ROM, any other suitable type of storage component, or any combination thereof. Additionally, the storage and/or memory 14 may include cache memory, semi-permanent memory such as RAM, and/or one or more different types of memory used for temporarily storing data. Accordingly, storage and/or memory 14 is structured to store data or media including application data (e.g., for implementing functions on the computer system 12).

Moreover, the input/output ("I/O") circuitry 15 can be operative to receive and convert a user input, e.g., physical contact inputs (e.g., from a multi-touch screen), physical movements (e.g., from a mouse or sensor), analog audio signals (e.g., from a microphone), or any other input. The data can be provided to and received from control circuitry 13, storage/memory 14 or any other component of the computer system 12, including the interactive puzzle application of the present invention.

Accordingly, the computer system 12 of the various embodiments of the present invention may include, but is certainly not limited to, a mobile or handheld device (e.g., mobile telephone, media device, PDA, mobile game system, etc.), a desktop computer, laptop or mobile computer, substantially stationary gaming system (e.g., XBOX, Playstation, Wii, etc.), arcade game system, etc.

Figure 2:
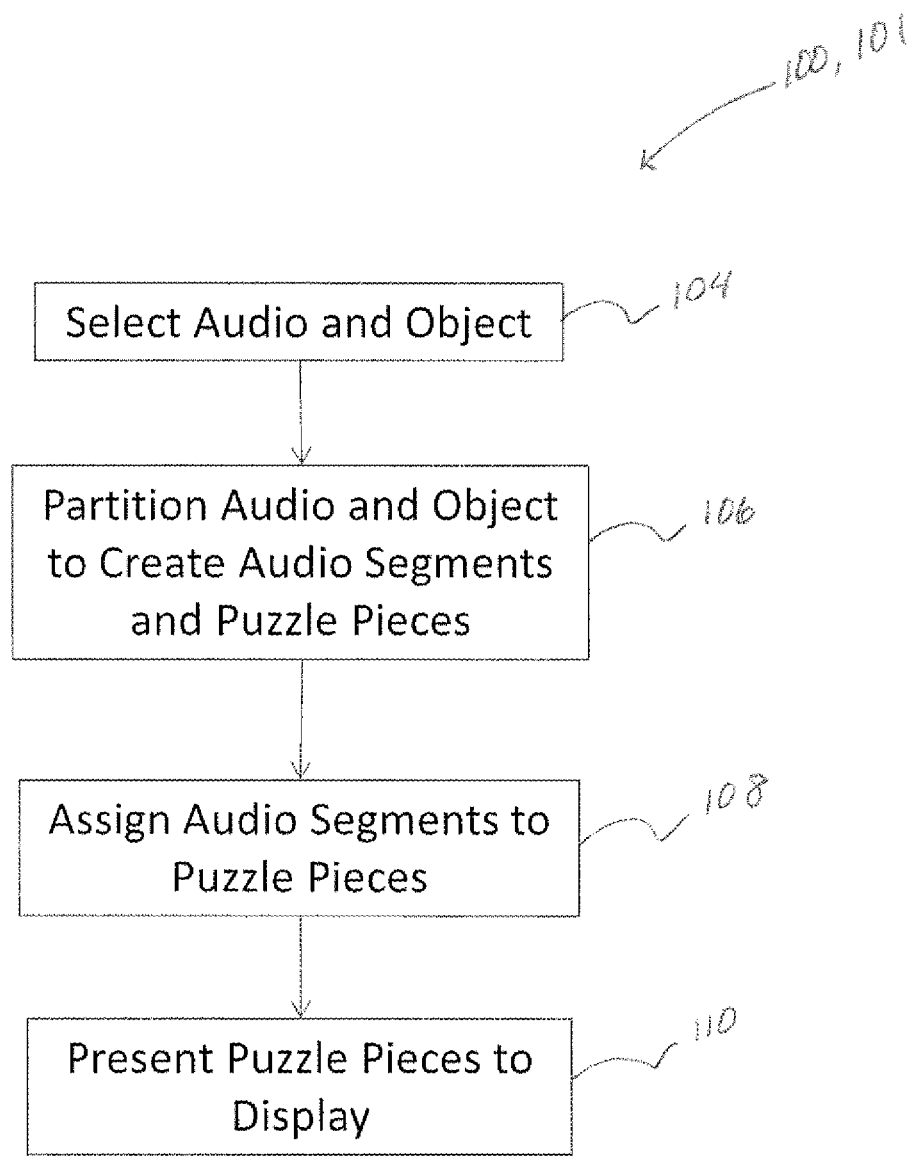
FIG. 2 is a high level flow chart illustrating the method of creating the interactive audio-visual puzzle of the present invention.

Referring now to the high-level flow chart illustrated in FIG. 2, an exemplary method 101 of creating or designing the interactive audio-visual puzzle is illustrated. In particular, the interactive audio-visual puzzle of the present invention may be created manually, for example, by an operator (with use of a computer system), or automatically by a pre-programmed computer program or module. Of course, even if the puzzle is created by a computer or computer process, certain aspects of the creation may be controlled, manipulated or otherwise directed by an operator, as will be apparent from the discussion herein.

Particularly, the method 100, 101 of at least one embodiment of the present invention comprises selecting an audio or musical composition, content or clip 20 and/or a continuous portion of an audio composition, content or clip 20, and selecting a graphical object 30 for use with the final puzzle, as generally shown at reference character 104. For example, the audio composition or audio content 20 may include any song, instrumental, or musical composition. In addition, the audio composition, content or clip 20 of at least one embodiment may include an audio reading of a poem, book, or other piece, spoken words, field sound recordings, sound effects, movie soundtracks, etc. The graphical object 30 of the various embodiments may include, for example, a digital or electronic image, photograph, drawing, painting, etc. In addition, the object 30 may be two or three dimensional items with visual components and structured to facilitate the practice of the present invention in the intended manner. In other embodiments, the object 30 may include moving images, animation, videos, video clips, etc.

Figure 4:
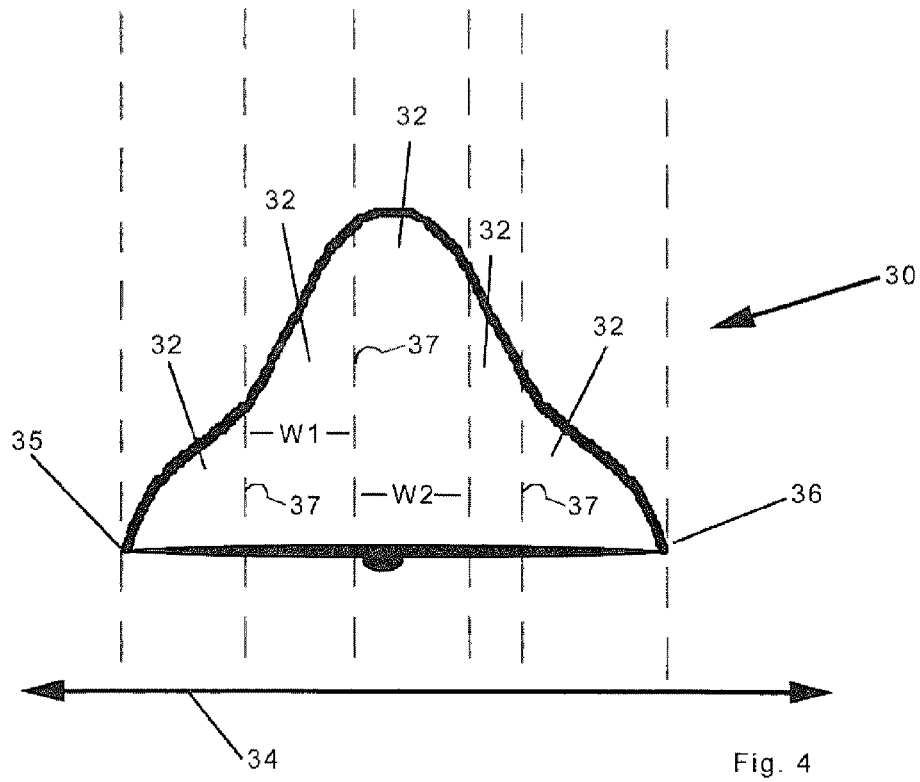
FIG. 4 is a graphical representation of the object and the various puzzle pieces associated therewith in accordance with at least one embodiment of the present invention.

In at least one embodiment, the selected musical or audio composition or audio content 20 and the graphical object 30 are at least partially related to one another in that the graphical object 30 is structured to depict, represent or otherwise visually symbolize the audio composition or content, e.g., the underlying meaning of the song, a description provided in the song, etc. As an example, in the event the audio content 20, or the selected continuous segment of the audio content 20, relates to or is otherwise descriptive in some manner to a "bell," then an appropriate digital graphical object 30 to select would be a two dimensional or three dimensional digital picture or image of a bell (as shown in FIG. 4). Of course, the object or image selected and the audio composition or audio content elected are virtually limitless. The object 30 may be two dimensional, as illustrated, or three dimensional and rotatable or otherwise maneuverable by the user.

Referring again to FIG. 2, the method 100 of at least one embodiment further comprises partitioning the audio composition or audio content 20 into a plurality of audio segments 22, and partitioning the image or graphical object 30 into a plurality of puzzle pieces 32, as collectively referenced at 106. In particular, the audio composition or audio content 20 and/or portion 21 thereof, is partitioned or otherwise broken into a plurality of audio segments 22, preferably by time, however, each of the various audio segments 22 need not be of equal lengths of time. It should be noted, however, that in other embodiments of the present invention, the audio composition, content and/or portion thereof may be partitioned into separate sounds, instruments, frequencies, etc., such that the partitioning need not be time-based. As an example, one audio segment 22 may comprise the sound of an audio frequency band (e.g., 250 Hz-500 Hz), and other segments may comprise the audio content of other frequency bands from the same program material (recording)

The graphical object 30 or image is also partitioned into separate puzzle pieces 32, as generally shown in the exemplary embodiment of FIG. 4. This partitioning may be implemented manually by a user directing a computer program or slicing module to slice or partition the object 30 as desired. In other embodiments, the slicing module may automatically or autonomously partition or slice the object into appropriate puzzle pieces 32. In one embodiment, the number of puzzle pieces 32 will correspond to the same number of audio segments 22 partitioned. However, as will be described below, at least one embodiment of the present invention further comprises one or more faux puzzle pieces which are structured to exhibit a false or incorrect graphical image, a false, incorrect or non-connecting configuration or shape, and/or a false, incorrect or non-existent audio component such that it is not used to solve the puzzle.

In any event, as generally represented at reference character 108, the genuine puzzle pieces 32 are assigned a corresponding one of the audio segments 22, such that disposition of the puzzle pieces 32 into the correct solved, aligned or side-by-side orientation (as shown in FIG. 4) also aligns the corresponding or assigned audio segments 22 in the correct playable order. In particular, each of the puzzle pieces 32 includes an audio component that corresponds to one of the audio segments 22. For purposes of implementation, the audio component may simply be a pointer or other defining information or data that allows the interactive puzzle application and/or computer system of the present invention to recognize which segment 22 of the selected audio composition or audio content 20 is associated with which particular puzzle piece 32. In other words, the puzzle piece 32 may, but need not, include an object comprising the actual audio, and may instead include appropriate data points, pointers, or identifying parameters sufficient to implement the present invention in the intended manner.

Moreover, in at least one embodiment, the partitioning of the object 30 may generally include slicing or separating the object 30 into pieces or segments following a predefined or predetermined order, including, but certainly not limited to, from left to right (as shown in FIG. 4), or from top to bottom, for example. Specifically, in at least one embodiment, the object 30 is partitioned along a single axis 34 from a first end 35 to a second end 36. The partitioning lines 37 of at least one embodiment may be substantially perpendicular to the partitioning axis 34 in order to create the various puzzle pieces 32. Of course, in other embodiments, the partitioning lines 37 may be jagged, curved, rounded, angular, etc., and need not be perpendicular at all to the axis 34. In fact, the puzzle pieces 32 and/or partitioning lines 37 may, in some embodiments, be created in virtually any shape, lines, angles, curves, etc. For clarity, the partitioning axis 34 may be defined along an x-axis (horizontally, as generally shown in the drawings), along a y-axis (vertically), a z-axis (representing the depth in a three dimensional object), or any other axis or line, whether straight, curved, jagged, etc.

Figure 3:
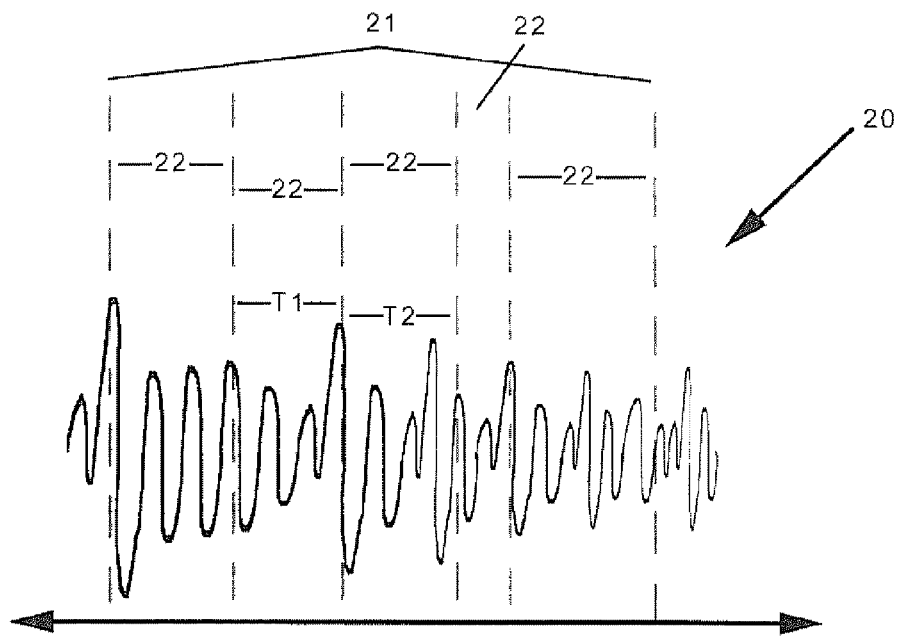
FIG. 3 is a graphical representation in waveform of an exemplary audio composition and the various audio segments associated therewith in accordance with at least one embodiment of the present invention.

In any event, the single axis 34 of at least one embodiment is structured to represent a timeline associated with the audio composition or audio content 20. Specifically, in one such embodiment, each of the puzzle pieces 32 may exhibit a visual component that is substantially proportional to the assigned or associated audio component 22. For example, the visual or dimensional properties of a given puzzle piece 32 may, in some embodiments, comprise a width, height, length, area, or volume dimension that is proportional to the time dimension of the associated audio segment 22. Referring again to the example illustrated in FIGS. 3 and 4, each of the puzzle pieces 32 as shown include a width "W" that is proportional to the time "T", of the corresponding audio segment 22. Specifically, width W1 is proportional to time T1 and width W2 is proportional to time T2. Thus, a puzzle piece 32 that is associated with an audio segment 22 that is three seconds long comprises a shorter width W than a different puzzle piece that is associated with an audio segment 22 that is ten seconds long. The proportional dimensional property or component need not be the width W, and may instead be any component or characteristic of the puzzle piece 32, such as the area, volume, height, length, etc.

It should be noted, however, that in at least one embodiment, the puzzle pieces 32, and in particular, the size properties or components thereof (e.g., width, height, area, volume, etc.) need not be proportional to the time or other component of the audio segment.

Finally, once the puzzle pieces and audio segments are generated and assigned to one another, as just described, the interactive audio visual puzzle is presented to the user on a computer display, as represented at reference character 110. As described herein, the display 16 may, but need not be touch sensitive, and can include virtually any monitor, television, handheld device, etc.

Accordingly, as will now be described, in order to play the game or otherwise solve the puzzle, as generally illustrated at 102 in the high-level flow chart of FIG. 5 and the example shown in FIGS. 6A through 6F, a user or player must recreate the visual depiction of the object 30 and the continuous portion of the audio composition or content 20 by disposing the puzzle pieces 32 in the correct aligned or side-by-side orientation. The player may use the visual depiction or shape/configuration of the puzzle pieces 32 to assist with the correct placement of the puzzle pieces 32. In addition, the player may also or instead use the corresponding audio component associated with the puzzle pieces in order to assist with the correct organization or placement thereof.

Figure 6E:
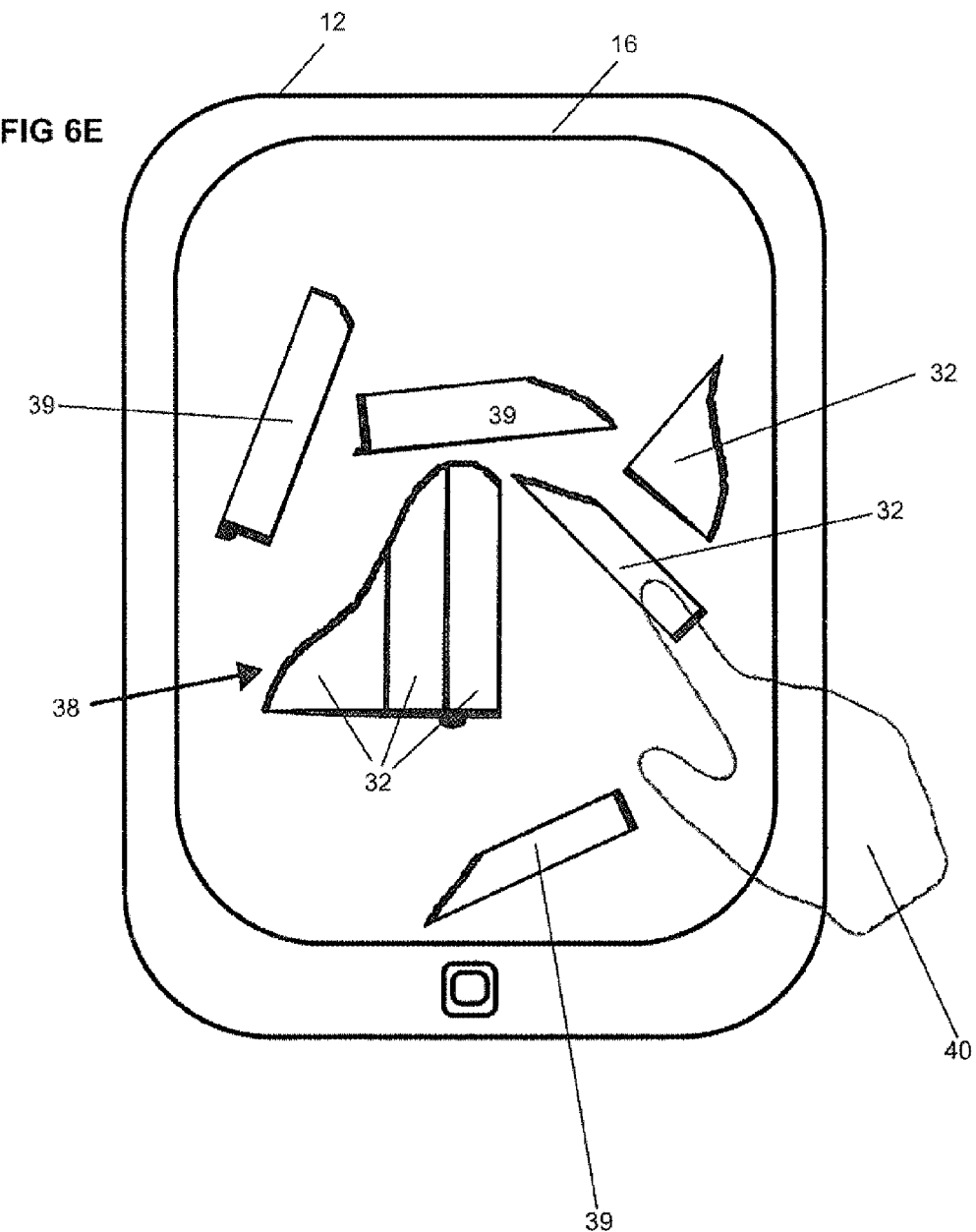

In particular, once the puzzle pieces 32 are created, the interactive puzzle application of the present invention is further structured to display 112 the puzzle pieces 32 on a display 16 of the computer system 12. The display 16 as shown in FIGS. 6A through 6F may be a touch-screen display commonly found on mobile telephones, tablets, personal computers and gaming systems. However, it should be apparent that the display 16 may be associated with virtually any computer system 12 as described further above. Particularly, the puzzle pieces 32 are displayed in a random fashion or otherwise scattered around the screen in a non-aligned or unsolved orientation, as illustrated in FIG. 6A.

In some embodiments, the interactive puzzle application also generates or otherwise displays one or more faux puzzle pieces 39, as briefly described above. In particular, the faux puzzle pieces 39 are not used to create the final assembled object 30 and/or do not include a correct audio component. For example, the faux puzzle piece (s) 39 of at least one embodiment comprises a similar, nearly identical or identical visual appearance as one or more of the genuine puzzle pieces 32 (by virtue of comprising a similar or identical shape or configuration), although, the faux puzzle piece 39 comprises a defunct audio component in that disposition of the faux puzzle piece 39 in the correct visually aligned orientation (in place of the genuine puzzle piece 32) will result in an incorrect collective audio portion that does not correspond to the audio composition or content 20. In such an embodiment, the faux puzzle piece 39 may have an audio component that is taken from the audio composition or content 20 but is in the wrong position, the faux puzzle piece 39 may have an audio component taken from a different audio composition (or made up), or the faux puzzle piece 39 may not have any audio component at all. In other embodiments, for instance, in cases where the audio composition or audio content is a classical music composition, the faux puzzle piece(s) 39 may include an audio component take from or corresponding to the correct audio segment 22, but with one note or a series of notes added, substituted or removed, resulting in a slightly different composition that, although similar to the correction composition, is not correct to complete the puzzle.

In other embodiments, the faux puzzle piece 39 may have an appropriate or correct audio component, but does not correctly fit visually with the other puzzle pieces. In other words, a player with keen hearing may be able to identify the faux puzzle piece as comprising a correct audio component, however, the faux puzzle piece 39 will not visually fit within the completed or solved puzzle.

Figure 5:
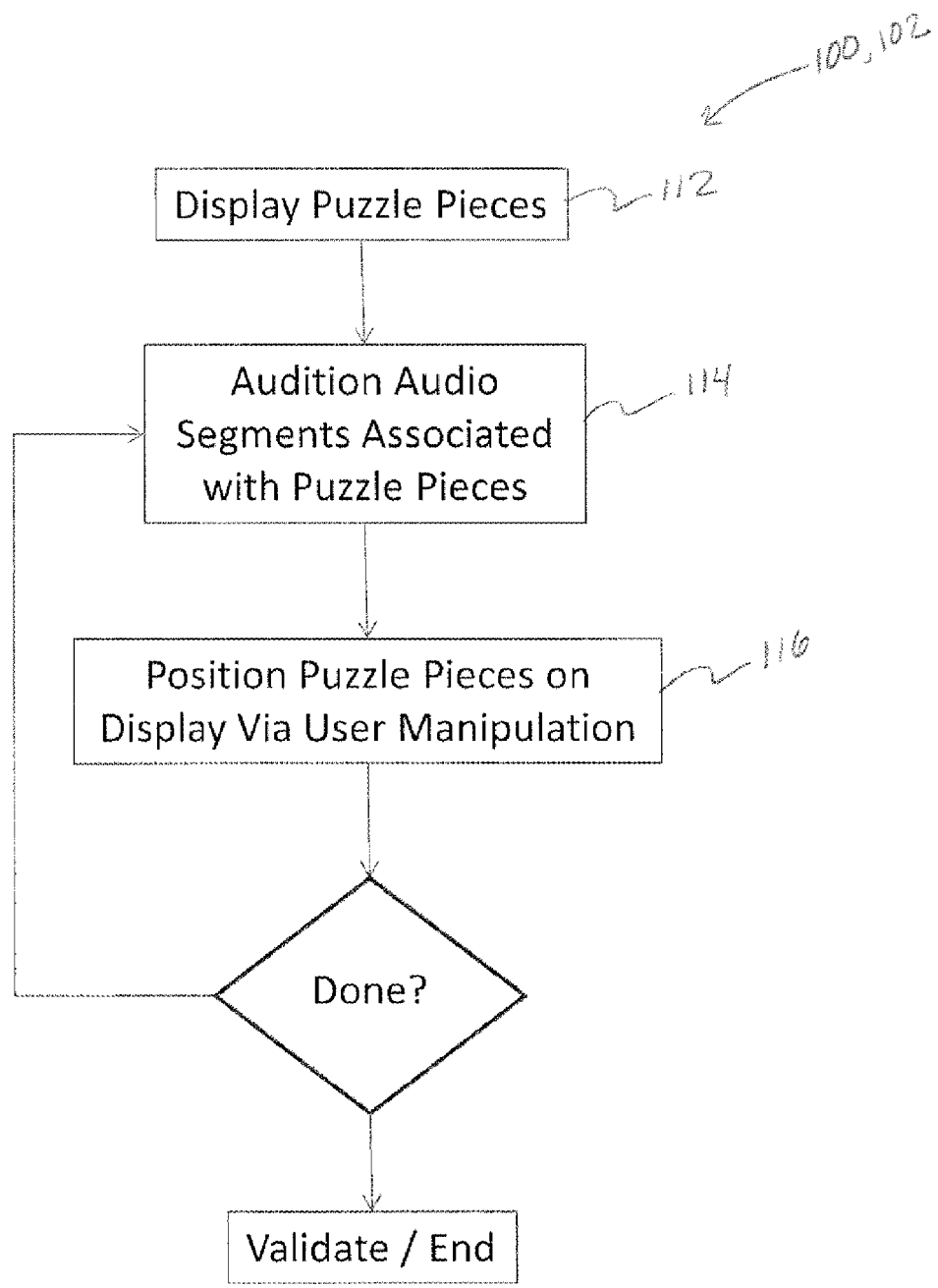
FIG. 5 is a high level flow chart of the method of solving the interactive audio-visual puzzle of the present invention.

In any event, as shown in FIG. 5 at reference character 114, the player may audition the various puzzle pieces 32 to hear the corresponding audio component associated therewith. In order to do so, the player will select one or more of the puzzle pieces, for example, by touching the puzzle piece(s) (in a touch screen application), clicking on the puzzle piece(s), pointing to the puzzle piece(s), etc., in any input configuration associated with the particular computer system 12. Once selected, the interactive puzzle application is structured to play the sound or audio associated with the audio component corresponding to the selected puzzle piece (s) 32. In one embodiment, the player must individually select and play each puzzle piece 32, however, in other embodiments, the player may select more than one puzzle piece 32 in a particular order so the interactive puzzle application of the present invention will collectively play the audio components in that particular order.

Furthermore, as represented at 116, based upon the visual representation and/or the audio component of the puzzle pieces 32, the player will position the puzzle pieces 32, for example, by dragging, rotating, or otherwise moving the puzzle pieces 32 in an attempt to dispose the puzzle pieces 32 in the correct aligned, solved and/or side-by-side orientation. Accordingly, the puzzle pieces 32 may be manipulated or moved by rotating the puzzle piece (about a two or three dimensional axis) and/or dragging the puzzle pieces 32 to a different location on the screen or display 16.

The aligned, solved orientation is defined as the puzzle pieces 32 being disposed in the correct position to reconstruct the visual object and to reassemble the audio segments 22 in the appropriate and correct order corresponding to the initial audio composition 20 or portion 21 of the audio composition 20 As an example, when collectively played from left to right, the audio components of the corresponding puzzle pieces 32 will correctly play the audio composition 20 or portion 21 thereon, if the puzzle pieces 32 are disposed in the aligned, solved orientation.

In one embodiment, the system 10 is structured to reveal hints or solutions in order to assist the player in manipulating the puzzle pieces 32 into the correct solved orientation. As an example, when requested by the user, the system 10 may reveal the correct location of one or more selected puzzle pieces 32, for instance, by revealing a number corresponding to the solved position of the corresponding puzzle piece 32. Specifically, in one embodiment, the player may rotate a selected puzzle piece to an underside (or otherwise flip the puzzle piece over) by gesturing on the screen or otherwise directing the application to do so. The underside of the puzzle piece 32 may then reveal the correct solved position (e.g., by position number) of the corresponding puzzle piece 32. Other hints, partial solutions, or full solutions to the puzzle of the present invention are contemplated.

Referring now to the example illustrated in FIGS. 6A through 6F, the interactive puzzle application initially displays the puzzle pieces 32 and faux puzzle pieces 39 in a random, scattered and non-aligned orientation on the display 16 (FIG. 6A). As schematically represented in FIG. 6B, the player 40 can audition the audio components 22 associated with the puzzle pieces 32 by selecting one or more of the puzzle pieces 32. For instance, when selected, the interactive puzzle application is structured to identify the corresponding audio component 22 and play the audio to the player through the computer system 12 and the corresponding hardware.

As shown in FIGS. 6C, 6D and 6E, the player can also manipulate the puzzle pieced (e.g., by rotation, dragging, etc.) and reposition them in a desired orientation. Again, the goal is to position the puzzle pieces 32 in the correct, aligned, solved orientation, as discussed above. In particular, the interactive puzzle application is structured to recognize the player's selection and manipulation of the puzzle pieces 32 and register the movements on the display 16, as shown in FIGS. 6C, 6D, and 6E. The player can also select a group of connected or aligned puzzle pieces (generally represented as 38 in FIG. 6E) in order to collectively play or audition the audio components associated with the group 38 of puzzle pieces 32. The puzzle is solved when all of the puzzle pieces 32 (excluding the faux puzzle pieces 39) are aligned in the correct orientation, as illustrated in FIG. 6F. In this case, the image of a "bell" is visible via the collective puzzle pieces 32 and the portion 21 of the audio composition 20 is correctly reassembled via the left to right orientation of the audio components of the puzzle pieces 32.

As noted above, the various puzzle pieces 32 may be movably disposed about the display 16, for example, by a directional or planar movement and/or rotational movement. Thus, with reference to the rotational movement, the various puzzle pieces 32 may be disposed between a rotationally aligned and a rotationally unaligned relation. Specifically, the puzzle pieces are rotationally aligned when the rotational disposition of the puzzle piece is such that the corresponding puzzle piece 32 can be disposed in an aligned relation relative to the other pieces 32, for example, along a representative timeline or axis 34.

Figure 7:
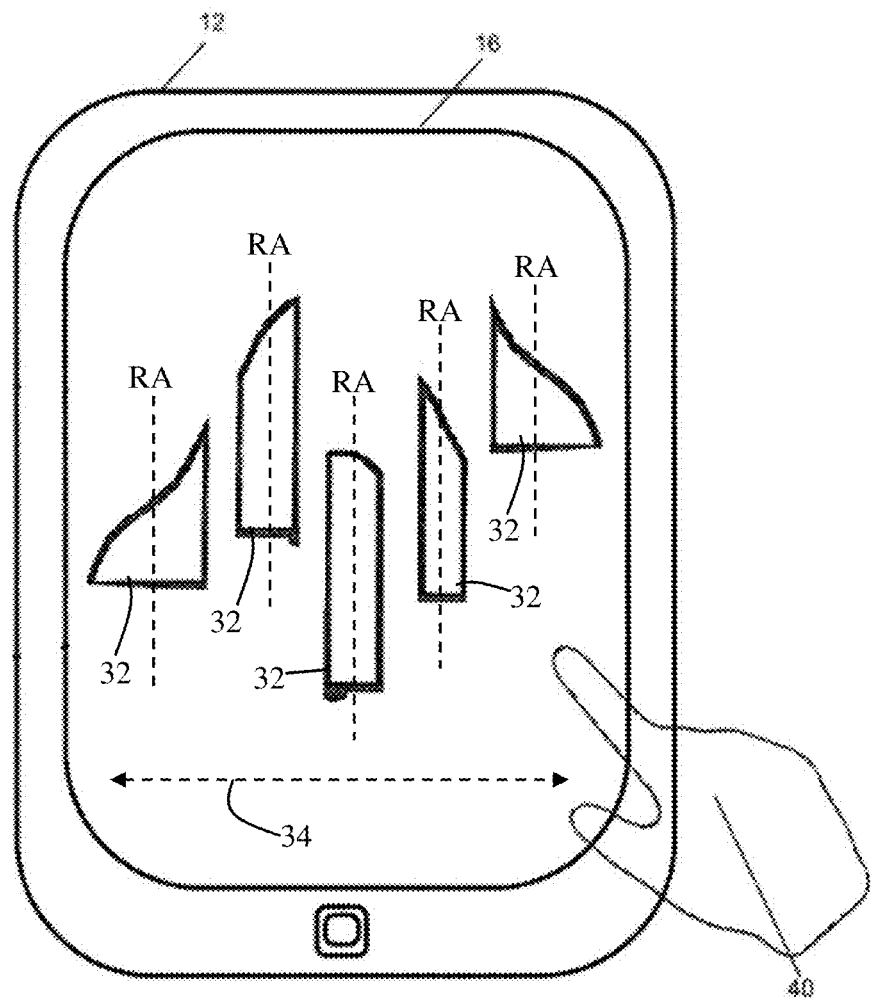
FIG. 7 is an exemplary screen shot illustrating a plurality of puzzle pieces disposed in a rotationally aligned relation, as disclosed in at least one embodiment of the present invention.

Referring to FIG. 7, each of the puzzle pieces 32 are disposed in a rotationally aligned relation in that the puzzle pieces 32 are each rotationally disposed in a manner such they can be aligned along the timeline or axis 34 to complete the puzzle. For clarity, the puzzle pieces 32 represented in FIG. 6A, for example, are disposed in a rotationally unaligned relation in that the puzzle pieces 32 must be rotated on the display in order to align them to solve the puzzle.

As should be apparent, the puzzle pieces 32 may be initially disposed by the interactive puzzle application in a rotationally aligned or rotationally unaligned relation, and further, the user may manually manipulate the puzzle pieces 32 on the display by moving the pieces in a planar manner across the display, or by rotationally manipulating the pieces on the display.

Further, in at least one embodiment of the present invention, when a puzzle piece 32 is disposed in a rotationally unaligned relation the audio component associated therewith may be modified. For instance, if a puzzle piece is rotationally unaligned beyond a predetermined rotational threshold, the audio component associated with the puzzle piece 32 may be modified. The modified audio component may be a reversed version of the corresponding audio component in that the corresponding audio component may be played in reverse when the puzzle piece is rotationally unaligned beyond a predetermined rotational threshold. Other modified audio components may include substituted notes, reversed lyrics, a replacement audio component, etc.

Figure 8A:
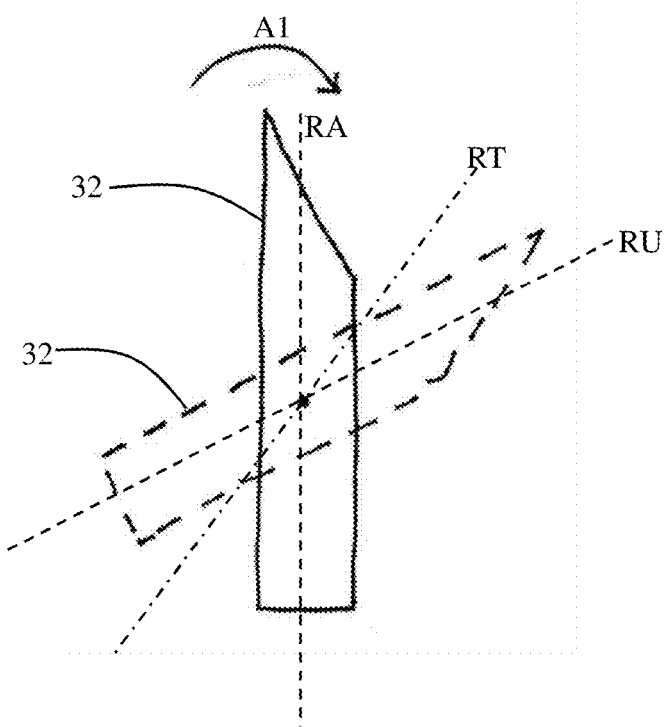
FIGS. 8A and 8B are exemplary schematics illustrating a puzzle piece disposed in a rotationally unaligned relation beyond a predetermined rotational threshold, as described in accordance with at least one embodiment herein.
Figure 8B:
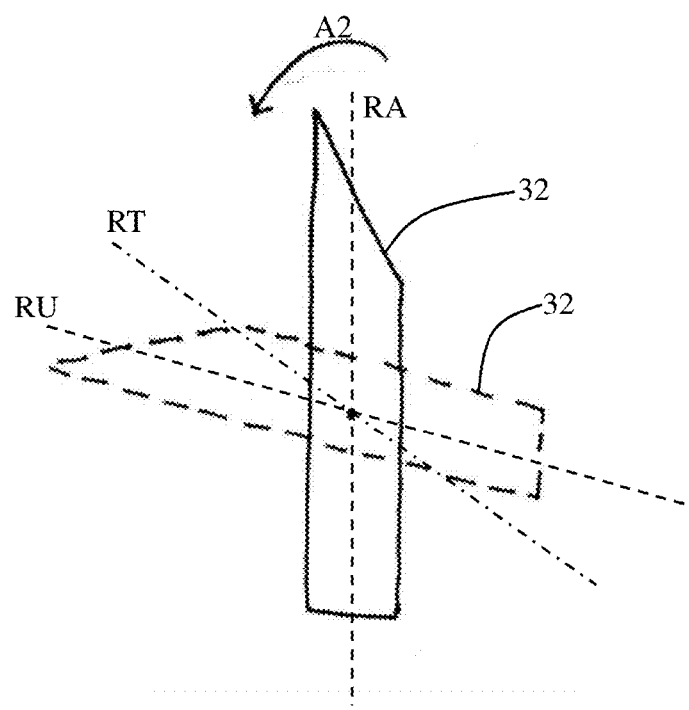

For illustrative purposes, FIGS. 7, 8A and 8B show a rotationally aligned axis, represented as RA, for each of the puzzle pieces 32. Although the rotationally aligned axis RA is shown as being perpendicular to the timeline or axis 34, it need not necessarily be in that the rotationally aligned axis RA shown is merely for reference as to the rotational disposition of the puzzle piece 32. For instance, referring to FIGS. 8A and 8B, the puzzle piece(s) 32 in dashed lines represent the puzzle piece being rotationally disposed away from the rotationally aligned axis RA, for instance in the direction represented by arrows A1 and A2. A predetermined rotational threshold RT or boundary may be defined by the system or interactive puzzle application, in that when the puzzle piece 32 is rotated beyond the rotational threshold RT such that the rotationally unaligned axis RU is beyond the rotational threshold, then the audio component associated therewith may be modified, as described herein.

In certain embodiment, the rotational threshold may be an angular representation measured from the rotationally aligned axis RA, for example, forty five degrees, seventy five degrees, eighty degrees, ninety degrees, etc. from or away from the rotationally aligned axis RA. Of course, other rotational thresholds RT are contemplated within the full scope of the present invention.

In certain embodiments, the interactive puzzle application of the present invention may be structured to automatically move the puzzle pieces 32 about or on the display, for example, without user interaction or otherwise without the user manipulating the puzzle pieces 32. In this regard, the puzzle pieces 32 may move across the screen or display, or in some embodiments be rotationally disposed automatically without user manipulation or interaction. These movements can be random, periodic, constant, slow, fast, or vary in speed. It should also be noted that the puzzle pieces may automatically move about the display in a pattern (e.g., circular pattern, spiral pattern, etc.) In this manner, if the puzzle pieces 32 are rotationally disposed (e.g., automatically or without user manipulation) beyond the predetermined rotational threshold RT, as described above, the corresponding audio component may be modified, as also described above. This adds a significant level of difficulty to the puzzle in that the user will need to rotationally align the puzzle piece or otherwise rotate the puzzle piece such that it is not rotated in a rotationally unaligned relation beyond the rotational threshold RT in order to sample the correct audio component.

Figure 9:
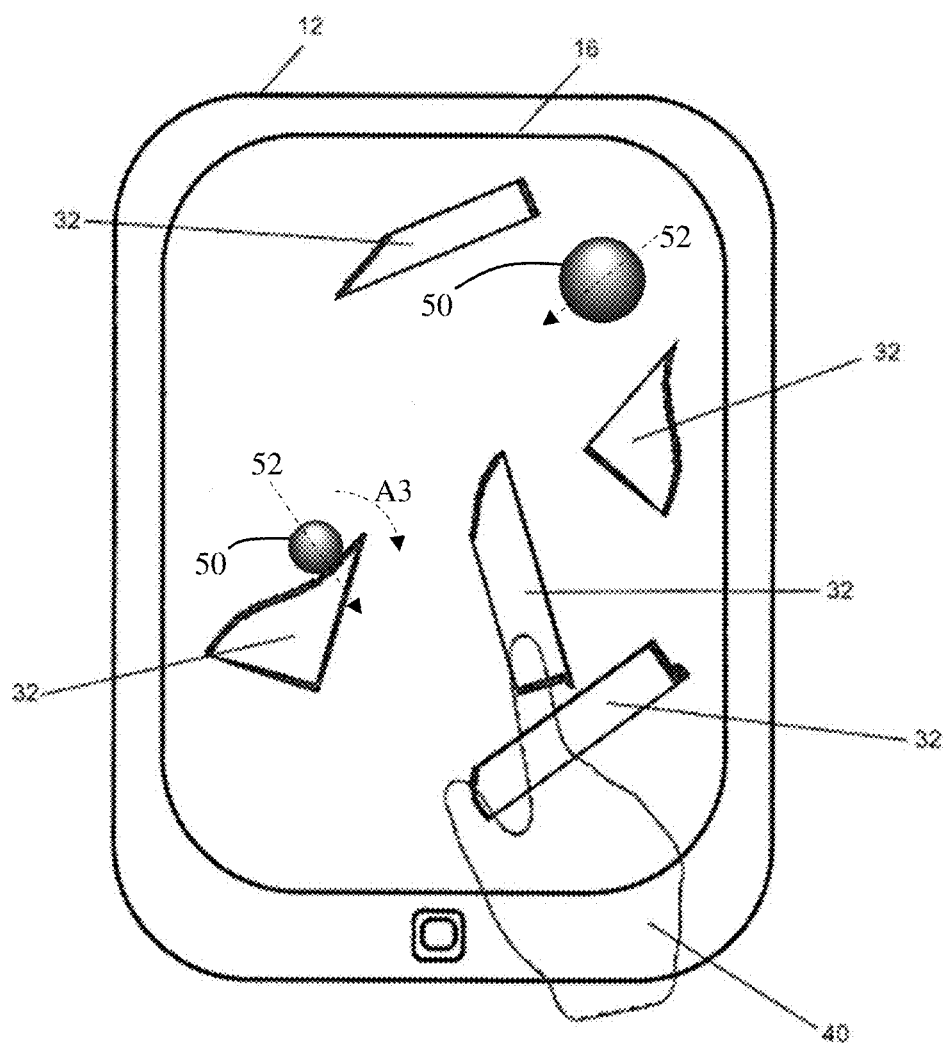
FIG. 9 is an exemplary screen shot illustrating disruptive objects movably disposed about the display, as provided in at least one embodiment herein.

Furthermore, referring now to FIG. 9, certain embodiments may also include one or more disruptive objects 50 that may be automatically movably disposed about the display and virtually collide with the puzzle pieces 32. As shown, the disruptive objects 50 are represented by round, circular or spherical objects although any moving object may be used or implemented. Arrows 52 are provided to show the projected patch and travel of the disruptive objects 50, although it should be noted that the paths of the disruptive objects need not be linear and can instead or in addition be random, circular, curved, trajectory, etc.

Moreover, it should be apparent that the disruptive objects 50 are not used to solve the puzzle, but in some embodiments are rather implemented in order to disrupt the disposition of the puzzle pieces. For instance, upon a virtual collision between a puzzle piece 32 and a disruptive object 50, the corresponding puzzle piece may be caused to rotate, move in a planar fashion, or otherwise be movably disposed as a result. The corresponding collision movements of the puzzle pieces may be implemented to substantially represent or comply with laws of physics, although it is not necessary in each implementation. For instance, arrow A3 illustrates the general rotational movement of the corresponding puzzle piece 32 as a result of the virtual collision or impact from the disruptive object 50 at or near an end of the puzzle piece 32. As another example, in the event the disruptive object collides with a puzzle piece in the direct center of the puzzle piece, there will likely be little to no rotational movement or disposition, but rather a linear or planar movement in the direction of the impact or collision.

The various puzzle pieces may also be movably (e.g., linear, planar, or rotational) as a result of virtual impacts or collisions with other puzzle pieces, environment objects (e.g., borders, stationary (non-moving) disruptive objects, etc.)

Furthermore, if the puzzle piece 32 is rotationally disposed (e.g., as a result of a virtual collision from a disruptive object, another puzzle piece, an environment object or border, etc.) beyond the predetermined rotational threshold RT, as described above, the corresponding audio component may be modified, as also described above.

In certain embodiments, the automatic movement (e.g., liner, planar or rotational) of a particular puzzle piece 32 (e.g., as a result of a virtual collision or as a results of a continuous, periodic or random movement, for instance) may be stopped when a user touches or selects the particular puzzle piece 32. Other more difficult levels or implementations, however, may not stop the movement of the pieces when selected or touched by a user.

In yet another embodiment, the present invention may include one or more faux puzzle pieces 39 with a dynamically changing incorrect audio component, meaning that the audio component associated with the particular faux puzzle piece 30 may change throughout the course of the game, but will always be incorrect. The incorrect audio component may include, for example, an incorrect portion of the audio content or audio composition or a substantially correct portion of the audio content or composition although with one or more misplaced, added, or removed notes, instruments, lyrics, words, etc. Other embodiments of the incorrect audio component may include a completely different audio clip from a different source or different audio content, etc. In any event, the incorrect audio component will not create the solved puzzle when the faux puzzle piece is disposed in an aligned relation with the other puzzle pieces in that the continuous audio content will not be present. Furthermore, it should be noted that such a faux puzzle piece 39 may include a correct visual component, as described in more detail above.

More in particular, the dynamically changing incorrect audio component, as provided herein, may be changed (from one incorrect audio component to another, different incorrect audio component) randomly, periodically, or in some cases, upon the presence of a predetermined event. As an example, the predetermined event may include a virtual collision between the faux puzzle piece 39 and a disruptive object 50, a virtual collision between the faux puzzle piece 39 and another puzzle piece 32, or user manipulation of the faux puzzle piece 39, such as user selection, auditioning of the incorrect audio component of the faux puzzle piece, rotation or other movement of the faux puzzle piece, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A computer-based interactive audio-visual puzzle for the arrangement of audio components associated with a plurality of puzzle pieces to collectively create a continuous audio content, comprising:
   an interactive puzzle application accessible via a computer system, the computer system comprising a computer processor, a memory device, a display, and a user input device,
   said interactive puzzle application structured to present a plurality of puzzle pieces on the display, said plurality of puzzle pieces being structured for user manipulated disposition into an aligned orientation,
   each of said plurality of puzzle pieces comprises a visual component and an audio component,
   each of said plurality of puzzle pieces further being disposable in a rotationally aligned relation and a rotationally unaligned relation, wherein said puzzle pieces disposed in said rotationally unaligned relation beyond a predetermined rotational threshold comprise a modified audio component,
   wherein said aligned orientation of said plurality of puzzle pieces is defined as a connected arrangement of said plurality of puzzle pieces along a single axis while each of said plurality of puzzle pieces are disposed in said rotationally aligned relation, wherein said single axis represents a timeline associated with said audio component from a starting puzzle piece to an ending puzzle piece, and
   wherein said audio components of said connected arrangement of said plurality of puzzle pieces collectively represent said continuous audio content along said timeline.

2. The puzzle as recited in claim 1 wherein said modified audio component is defined as said audio component played in reverse.

3. The puzzle as recited in claim 1 wherein said predetermined rotational threshold comprises a rotational boundary defined approximately at least forty five degrees rotated away from said rotationally aligned relation.

4. The puzzle as recited in claim 3 wherein said predetermined rotational threshold comprises a rotational boundary defined approximately at least ninety degrees rotated away from said rotationally aligned relation.

5. The puzzle as recited in claim 4 wherein said modified audio component is defined as said audio component in reverse.

6. The puzzle as recited in claim 1 wherein said interactive puzzle application is structured to movably dispose said plurality of puzzle pieces about said display without user manipulation.

7. The puzzle as recited in claim 6 wherein said interactive puzzle application is structured to rotationally dispose said plurality of puzzle pieces about said display without user manipulation.

8. The puzzle as recited in claim 1 further comprising at least one disruptive object movably disposed about said display, said at least one disruptive object being structured to cause at least one of said plurality of puzzle pieces to be movably disposed about said display upon collision therewith.

9. The puzzle as recited in claim 1 further comprising at least one disruptive object movably disposed about said display, said at least one disruptive object being structured to cause at least one of said plurality of puzzle pieces to be rotationally disposed upon collision therewith.

10. The puzzle as recited in claim 1 wherein said visual components of said plurality of puzzle pieces disposed in said aligned orientation collectively and visually represent a predetermined graphical object at least partially representative of said audio composition.

11. A computer-based interactive audio-visual puzzle for the arrangement of audio components associated with a plurality of puzzle pieces to collectively create a continuous audio content, comprising:
    an interactive puzzle application accessible via a computer system, the computer system comprising a computer processor, a memory device, a display, and a user input device,
    said interactive puzzle application structured to present a plurality of puzzle pieces on the display, said plurality of puzzle pieces being structured for user manipulated disposition into an aligned orientation,
    said interactive puzzle application being further structured to movably dispose said plurality of puzzle pieces without user manipulation,
    said interactive puzzle application further comprising at least one disruptive object movably disposed on said display, wherein at least one of said plurality of puzzle pieces is movably disposed upon a virtual collision between said at least one of said plurality of puzzle pieces and said at least one disruptive object,
    each of said plurality of puzzle pieces comprises a visual component and an audio component,
    each of said plurality of puzzle pieces being disposable between a rotationally aligned relation and a rotationally unaligned relation,
    wherein said aligned orientation of said plurality of puzzle pieces is defined as a connected arrangement of said plurality of puzzle pieces along a single axis while each of said plurality of puzzle pieces are disposed in said rotationally aligned relation, wherein said single axis represents a timeline associated with said audio component from a starting puzzle piece to an ending puzzle piece, and
    wherein said audio components of said connected arrangement of said plurality of puzzle pieces collectively represent said continuous audio content along said timeline.

12. The puzzle as recited in claim 11 wherein at least one of said puzzle pieces disposed in said rotationally unaligned relation comprises a modified audio component.

13. The puzzle as recited in claim 11 wherein at least one of said puzzle piece disposed in said rotationally unaligned relation beyond a predetermined rotational threshold comprises said modified audio component.

14. The puzzle as recited in claim 13 wherein said modified audio component comprises a reversed version of said audio component corresponding said at least one puzzle piece disposed in said rotationally unaligned relation.

15. A computer-based interactive audio-visual puzzle for the arrangement of audio components associated with a plurality of puzzle pieces to collectively create a continuous audio content, comprising:
- an interactive puzzle application accessible via a computer system, the computer system comprising a computer processor, a memory device, a display, and a user input device,
- said interactive puzzle application structured to present a plurality of puzzle pieces on the display, said plurality of puzzle pieces being structured for user manipulated disposition into an aligned orientation,
- each of said plurality of puzzle pieces comprises a visual component and an audio component,
- wherein said aligned orientation of said plurality of puzzle pieces is defined as a connected arrangement of said plurality of puzzle pieces wherein said audio components of said plurality of puzzle pieces collectively represent said continuous audio content along a timeline defined from a starting puzzle piece to an ending puzzle piece, and
- at least one faux puzzle piece comprising a dynamically changing incorrect audio component, wherein disposition of said at least one faux puzzle piece in a connected relation with said plurality of puzzle pieces will define an incorrect aligned orientation.

16. The puzzle as recited in claim 15 wherein said at least one faux puzzle piece comprises a correct visual component.

17. The puzzle as recited in claim 16 wherein said interactive puzzle application is structured to modify said dynamically changing incorrect audio component upon a predetermined event associated with said at least one faux puzzle piece.

18. The puzzle as recited in claim 17 wherein said predetermined event comprises a collision with a disruptive object.

19. The puzzle as recited in claim 18 wherein said predetermined event comprises a collision with at least one of said plurality of puzzle pieces.

20. The puzzle as recited in claim 17 wherein said predetermined event comprises user manipulation of said at least one faux puzzle piece.

* * * * *